United States Patent
Schulte et al.

(10) Patent No.: US 12,528,616 B2
(45) Date of Patent: Jan. 20, 2026

(54) METHOD AND DEVICE FOR HANDLING (FLAT) OBJECTS

(71) Applicant: Focke & Co. (GmbH & Co. KG), Verden (DE)

(72) Inventors: Josef Schulte, Aschendorf (DE); Andreas Prahm, Barssel (DE); Matthias Vocks, Strücklingen (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 158 days.

(21) Appl. No.: 18/260,288

(22) PCT Filed: Jan. 25, 2022

(86) PCT No.: PCT/EP2022/051580
§ 371 (c)(1),
(2) Date: Jul. 3, 2023

(87) PCT Pub. No.: WO2022/161931
PCT Pub. Date: Aug. 4, 2022

(65) Prior Publication Data
US 2024/0051759 A1  Feb. 15, 2024

(30) Foreign Application Priority Data
Jan. 29, 2021 (DE) .......................... 102021102034.4

(51) Int. Cl.
*B65B 63/02* (2006.01)
*B65B 13/20* (2006.01)
(Continued)

(52) U.S. Cl.
CPC ............ *B65B 63/026* (2013.01); *B65B 13/20* (2013.01); *B65B 63/02* (2013.01); *B65G 15/14* (2013.01);
(Continued)

(58) Field of Classification Search
CPC ..... B65B 63/02; B65B 63/022; B65B 63/026; B65B 13/20; B65G 15/22; B65G 15/24;
(Continued)

(56) References Cited

U.S. PATENT DOCUMENTS 2,962,848 A * 12/1960 Wilson .................. B65B 63/026
206/83.5
3,513,628 A * 5/1970 Lee ........................ B65B 63/026
53/259

(Continued)

FOREIGN PATENT DOCUMENTS

DE          3917810 A1   12/1990
DE     102011107290 A1    1/2013
(Continued)

OTHER PUBLICATIONS

WIPO, International Search Report (in a corresponding application), May 13, 2022.
(Continued)

*Primary Examiner* — Joshua G Kotis
(74) *Attorney, Agent, or Firm* — Laurence P. Colton; Smith Tempel Blaha LLC

(57) ABSTRACT

A method for handling flat objects, in particular sanitary products, such as nappies, sanitary towels or the like, wherein a group of objects is subjected to a compression operation in a compression device so that the group of objects has a degree of compression as a result of the compression. A plurality of compression devices are arranged one after the other so that the group of objects which is compressed with a compression device is supplied to the following compression device with the respective degree of compression thereof and is further compressed in this compression device in order to achieve a higher degree of compression.

10 Claims, 6 Drawing Sheets

(51) Int. Cl.
  *B65G 15/14* (2006.01)
  *B65G 15/22* (2006.01)
(52) U.S. Cl.
  CPC ........ *B65G 15/22* (2013.01); *B65G 2201/022* (2013.01)
(58) Field of Classification Search
  CPC .. B65G 15/14; B65G 15/16; B65G 2201/022; B30B 5/06; B65H 2301/4223
  USPC .................................... 53/439, 530
  See application file for complete search history.

(56) References Cited

U.S. PATENT DOCUMENTS

| | | | | |
|---|---|---|---|---|
| 3,837,138 | A * | 9/1974 | Terry | B65B 63/026 53/553 |
| 3,848,398 | A * | 11/1974 | Suhr | B65B 9/026 53/553 |
| 4,592,193 | A * | 6/1986 | Gustavsson | B65B 63/026 53/550 |
| 4,738,078 | A * | 4/1988 | Benz | B65B 11/10 53/228 |
| 5,979,145 | A * | 11/1999 | Louis | B30B 5/06 53/436 |
| 6,112,501 | A * | 9/2000 | Pollock | B65B 63/02 53/529 |
| 6,223,500 | B1 * | 5/2001 | Kramps | B65B 11/10 53/399 |
| 6,571,694 | B1 * | 6/2003 | Gustafsson | B65B 63/02 100/151 |
| 11,890,829 | B2 * | 2/2024 | Iwai | B26D 7/0675 |
| 2006/0130431 | A1 * | 6/2006 | Baggot | B65B 63/02 53/529 |
| 2007/0163606 | A1 * | 7/2007 | Chojnacki | B65G 15/14 131/111 |
| 2007/0277479 | A1 * | 12/2007 | Hansen | B65B 9/026 53/436 |
| 2009/0320697 | A1 * | 12/2009 | Rago | B30B 5/06 100/153 |
| 2011/0289886 | A1 * | 12/2011 | Martin | B65B 35/46 53/436 |
| 2014/0137515 | A1 * | 5/2014 | Brandhorst | B65B 63/02 53/529 |
| 2015/0203231 | A1 * | 7/2015 | Brandhorst | B65B 57/005 100/90 |
| 2018/0155102 | A1 * | 6/2018 | Wallenius | B65D 71/06 |
| 2018/0354667 | A1 * | 12/2018 | Wallenius | B65B 63/026 |
| 2021/0009299 | A1 * | 1/2021 | Gabrielli | D21H 27/02 |

FOREIGN PATENT DOCUMENTS

| | | | | |
|---|---|---|---|---|
| EP | 0400598 | A1 * | 5/1990 | ............ B65B 63/02 |
| WO | 9926846 | A1 | 6/1999 | |
| WO | 2014029481 | A1 | 2/2014 | |

OTHER PUBLICATIONS

Deutsches Patnet-Und Markenamt (German Patent and Trademark Office), Recherchebericht (search in a corresponding application), Dec. 3, 2021.

* cited by examiner

METHOD AND DEVICE FOR HANDLING (FLAT) OBJECTS

CROSS REFERENCE TO RELATED APPLICATIONS

This application is the US national phase of and claims the benefit of and priority on International Application No. PCT/EP2022/051580 having an international filing date of 25 Jan. 2022, which claims priority on and the benefit of German Patent Application No. 10 2021 102 034.4 having a filing date of 29 Jan. 2021.

BACKGROUND OF THE INVENTION

Technical Field

The invention relates to a method for handling (flat) objects, in particular sanitary products such as nappies, sanitary towels or the like, wherein a group of objects is subjected to a compression operation in a compression device so that the group of objects has a degree of compression as a result of the compression.

Furthermore, the invention relates to a corresponding apparatus, in particular for carrying out the method, having a compression device in which the group of objects is subjected to a compression operation so that the group of objects has as a result of the compression a degree of compression.

Prior Art

During the handling of sanitary products, it is conventional in practice for a group of objects to be subjected to a compression operation before the group is packed in the compressed state. In this manner, the packaging can be constructed to be correspondingly smaller in order to save packaging material and space for the storage.

However, it may be problematic during the compression of such groups of objects that considerable time is required in particular in order to allow the air to escape from the objects in order to thus compress the objects or the group. Longer cycle times are thereby required in order to adequately compress the group, which is disadvantageous with regard to the speed of known methods and apparatuses.

Attempts have sometimes been made in practice to shorten the cycle times by using correspondingly higher forces during compression. In this instance, however, damage may occur to objects and/or the group. Occasionally it has been observed that in particular nappies can burst as a result of an excessively high action of force during compression, wherein the outer layer becomes damaged. It has also sometimes been observed that the formation of the objects in the group is lost, for example, since the group has become deformed or individual objects are ejected from the group. In this regard, limits are placed on the increase of the action of force in order to reduce the cycle time during compression.

BRIEF SUMMARY OF THE INVENTION

An object of the present invention is considered to be to further develop methods and apparatuses of the type mentioned in the introduction, with particular regard to the most time-saving and/or product-protecting procedure possible with preferably the smallest possible spatial requirement for carrying out the method or the size of the apparatus.

A method according to the invention is a method for handling (flat) objects, in particular sanitary products, such as nappies, sanitary towels or the like, wherein a group of objects is subjected to a compression operation in a compression device so that the group of objects has a degree of compression as a result of the compression, characterized in that a plurality of compression devices are arranged one after the other so that the group of objects which is compressed with a compression device is supplied to the following compression device with the respective degree of compression thereof and is further compressed in this compression device in order to achieve a higher degree of compression. There is accordingly provision for a plurality of compression devices to be arranged one after the other so that the group of objects which is compressed with a compression device is supplied to the following compression device with the respective degree of compression thereof and is further compressed in this compression device in order to achieve a higher degree of compression.

In other words, there is provision for the compression to be carried out in steps in several successive compression devices. According to the invention, a subsequent compression device takes over the group which has been compressed by the previous compression device with the corresponding degree of compression and increases it.

Preferably, there may be provision for the compression devices to be arranged directly one after the other in order to transfer the group of objects with the respective degree of compression thereof directly from one compression device to a subsequent compression device.

This solution may have the advantage that the method can be carried out in a correspondingly space-saving manner.

In a particularly preferred embodiment, there may be provision for the compression devices to be arranged in a cascading manner one after the other so that the group of objects is increasingly compressed in each compression device.

Another specific feature may involve the group of objects being compressed in the respective compression devices during the continuous transport in a conveyor device.

Preferably there may be provision for the group of objects to be transported in all compression devices in a corresponding conveying direction.

Preferably, there may be provision for compression members of the respective compression device to bear on the group of objects at opposing sides and to be orientated substantially parallel with each other and moved toward each other transversely relative to the conveying direction in order to compress the group of objects, preferably during the continuous transport of the group of objects in the conveying direction in the respective compression devices.

Preferably, there may be provision for the group of objects to be transported through the compression members of the respective compression device in a conveying direction, whilst the compression members compress the group in the respective compression device.

Preferably, there may be provision for the group of objects to be transported along a (notional) conveying axis which preferably extends through all the compression devices in the conveying direction, wherein the compression members of the respective compression devices are arranged symmetrically at different sides of the conveying axis and during the compression are moved toward each other symmetrically relative to the conveying axis.

Preferably, there may be provision for the group of objects to bear at both sides on at least a portion of a conveyor strand of an endless conveyor as a compression member and for the conveyor strands to transport the group of objects continuously in the conveying direction and in this instance to be moved together in order to compress the group of objects during the transport.

Preferably, there may be provision for the conveyor strands of the endless conveyors of successive compression devices to be arranged in alignment in the conveying direction at both sides of the group when the group of objects are transferred.

Preferably, there may be provision for the group of objects in one or in some or in all of the compression devices to be initially compressed to a (slightly) higher degree of compression than is intended for the transfer to the subsequent compression device in each case and for the degree of compression to then be reduced to the corresponding degree for the transfer to the subsequent compression device in each case.

In other words, it is proposed that the group of objects is initially "over compressed" and is "relieved" for the transfer to the subsequent compression device to the degree provided for the transfer. The transfer itself is then carried out with the provided degree of compression.

Preferably, there may be provision for a plurality of groups of objects to be located and compressed at the same time in one or some or all of the compression devices.

An apparatus according to the invention is an apparatus for handling (flat) objects, in particular sanitary products such as nappies, sanitary towels or the like, preferably for carrying out the method as taught herein, having a compression device in which the group of objects is subjected to a compression operation so that the group of objects has as a result of the compression a degree of compression, characterized in that a plurality of compression devices are arranged one after the other so that the apparatus is configured to supply the group of objects which is compressed with a compression device with the respective degree of compression thereof to a following compression device and to further compress it in this compression device in order to achieve a higher degree of compression. There is accordingly provision for a plurality of compression devices to be arranged one after the other so that the apparatus is configured to supply the group of objects which is compressed with a compression device with the respective degree of compression thereof to a following compression device and further to compress it in this compression device in order to achieve a higher degree of compression.

Preferably, there may be provision for the compression devices to be arranged directly one after the other in order to transfer the group of objects with the respective degree of compression thereof directly from one compression device to a subsequent compression device.

Preferably, there may be provision for the compression devices to be arranged one after the other in a cascading manner, wherein the apparatus is configured to increasingly compress the group of objects in each compression device.

Preferably, there may be provision for compression members of the respective compression device to be arranged in abutment against the group of objects at opposing sides and to be orientated substantially parallel with each other and to be able to be moved transversely relative to the conveying direction in order to compress the group of objects, preferably during the continuous transport of the group of objects in the conveying direction in the respective compression devices.

Preferably, there may be provision for the compression members of a compression device to be formed by means of at least one portion of a conveyor strand of an endless conveyor, at the (external) transport side of which the group of objects bears laterally and for the conveyor strands, on the one hand, to be configured to transport the group of objects continuously in the conveying direction and, on the other hand, to be configured to be able to be moved together in order to compress the group of objects during the transport.

Preferably, there may be provision for the conveyor strands of the endless conveyors of successive compression devices to be arranged in alignment in the conveying direction at both sides of the group when the group of objects is transferred.

Preferably, there may be provision for the conveyor strands at an (internal) running side facing away from the transport side to be able to be supported by means of an internal support, in particular by means of a conveyor strand, which is supported on running rollers, of the internal support.

Preferably, there may be provision for the endless conveyors which form the compression members to be able to be moved toward each other by means of one or more drives in order to compress the group of objects, wherein there is preferably provision for the movement to be carried out in a horizontal plane and for the endless conveyors to be guided by means of a linear guiding gear mechanism.

Preferably, there may be provision for the endless conveyors of a compression member to be constructed to be identical in terms of structure at both sides of the group of objects, in particular with an identical arrangement of the respective members.

Preferably, there may be provision for the endless conveyors to be formed in each case by one or more belt conveyors, one or more band conveyors or one or more (toothed) belts.

BRIEF DESCRIPTION OF THE DRAWINGS

A preferred exemplary embodiment of the invention will be described below with reference to drawings, in which.

DETAILED DESCRIPTION OF PREFERRED EMBODIMENTS

Figure 1:
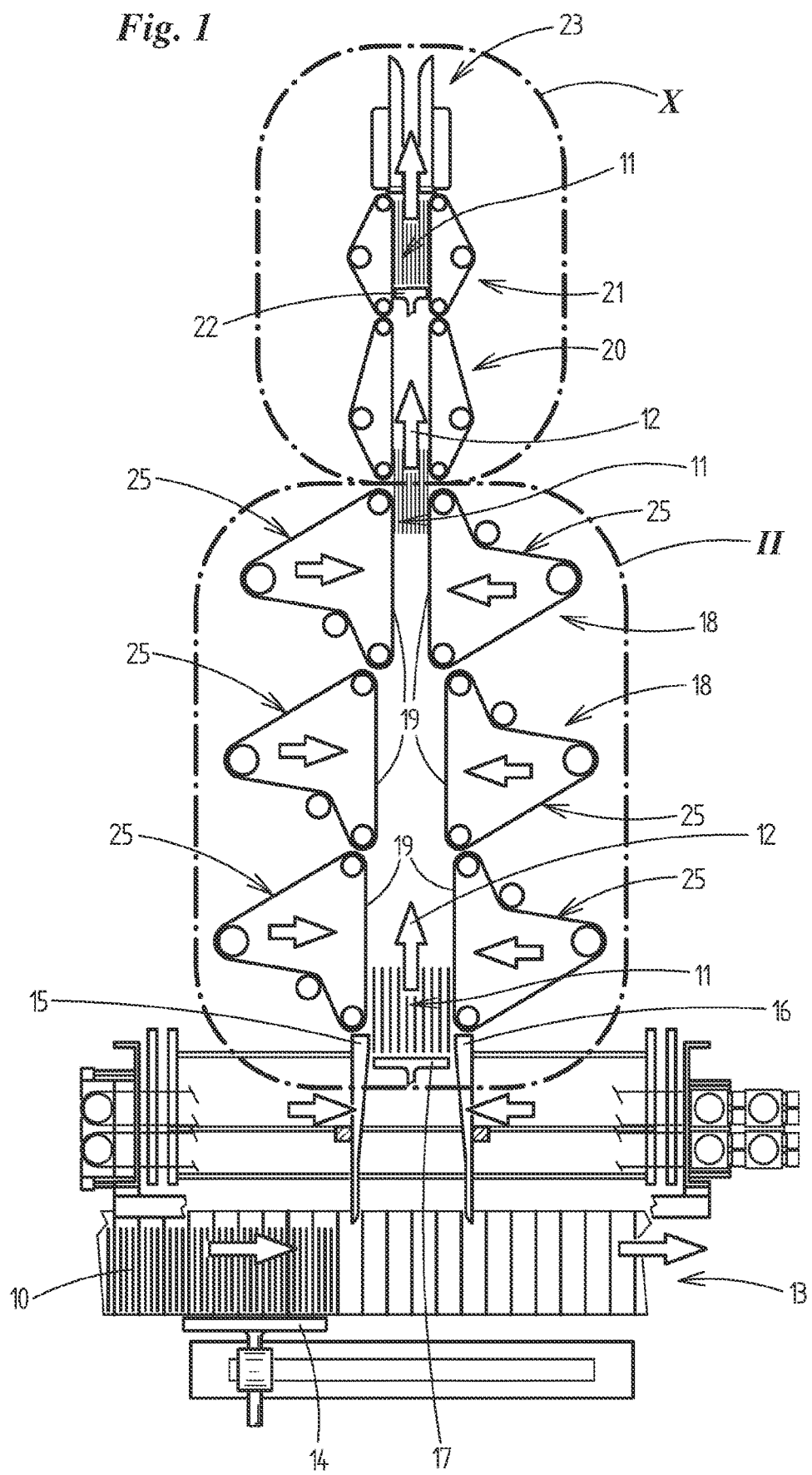
FIG. 1 shows an apparatus for handling groups of objects in a schematic plan view.

The invention will be described below with reference to a preferred exemplary embodiment in the form of an apparatus for handling nappies. Since the invention is not limited to such products or sanitary products, the general term object 10 is used below.

A plurality of objects 10 are handled as a group 11, wherein the objects 10 in the group 11 are arranged in a predetermined formation, for example, as a stack. In this instance, the objects 10 are arranged upright within the stack so that adjacent extensive side faces of the objects 10 bear on each other and face transversely relative to a (main) conveying direction 12.

Of course, other orientations or groupings of the objects 10 are also conceivable, in particular in a manner adapted to the actual product in each case.

The supply of the objects 10 is carried out in this instance by means of a compartment belt 13 in the compartments of which the objects 10 are arranged upright. The supply is carried out transversely relative to the conveying direction 12. By means of a sliding member 14, a group 11 of objects is pushed from the compartment belt 13 between compression jaws 15, 16 which run with the compartment belt 13 and are (pre-) compressed by moving together the compression jaws 15, 16. Afterwards, the compressed group 11 is pushed out in the conveying direction 12 by means of a sliding member 17.

The supply and first compression is described in detail in WO 2014/029481 A1 to which reference may be made for the purposes of complete disclosure. However, this type of supply and first compression represents only one possible solution which can also be modified or which can also be dispensed with. This part of the apparatus is accordingly optional and not necessarily provided in the context of the invention.

In order to compress the group 11 of objects 10, in this instance three compression devices 18 are provided. Of course, only two compression devices 18 or more than three compression devices 18 may also be provided.

The compression devices 18 are preferably arranged directly in succession in the conveying direction 12 one behind the other. However, it is also conceivable for (short) bridging devices to be arranged between the compression devices 18. It is also conceivable for other devices, conveying paths and the like to be provided between the compression devices 18.

The compression devices 18 are in each case configured to compress the group 11 of objects 10 to a predetermined compression degree. The degree of compression is linked with at least one dimension of the group 11 which is reduced by the respective compression device 18, for example, in this instance a width of the group 11 transversely relative to the conveying direction 12. It is also naturally conceivable to reduce another dimension of the group 11 by means of corresponding adaptation of the compression devices 18.

In FIG. 1, it can be seen that with each compression device 18 the compression or the degree of compression of the group 11 increases. The compression devices 18 are arranged one behind the other in a cascading manner so that the group 11 is more powerfully compressed in each compression device 18.

In FIG. 1, it can further be seen that the group 11 in each compression device 18 is compressed by means of lateral pressure on the group 11. There is provision for the side faces of the group to be acted on at both sides transversely relative to the conveying direction 12. This is carried out in each compression device 18 by means of compression members 19 of the compression devices 18 which are moved from opposing sides into abutment with the group 11 and are moved together in order to compress the group 11 until the intended degree of compression is achieved.

As can be seen in FIG. 1, the spacing between the compression members 19 decreases transversely relative to the conveying direction 1812 from compression device 18 to compression device 18 until at the end of the third compression device 18 the compression of the group 11 is complete and the group 11 can be packed. In this instance, two grouping stations 20, 21 are used for this following the third compression device 18. Together with a sliding member 22, groups 11 are transferred to a shuttle 23 and introduced into a packaging which is not shown, for example, a bag. Details of this portion of the apparatus will be described below.

The compression members 19 are in this instance in each case a conveyor strand 24 of an endless conveyor 25, for example, one or more band conveyors, belt conveyors or (toothed) belts. The endless conveyor 25 is in each case guided around a plurality of redirection rollers 26 and can be retained under tension by means of a clamping roller 27. With an external transport side the endless conveyors 25 bear in each case flat on one side of the group 11.

Figure 3:
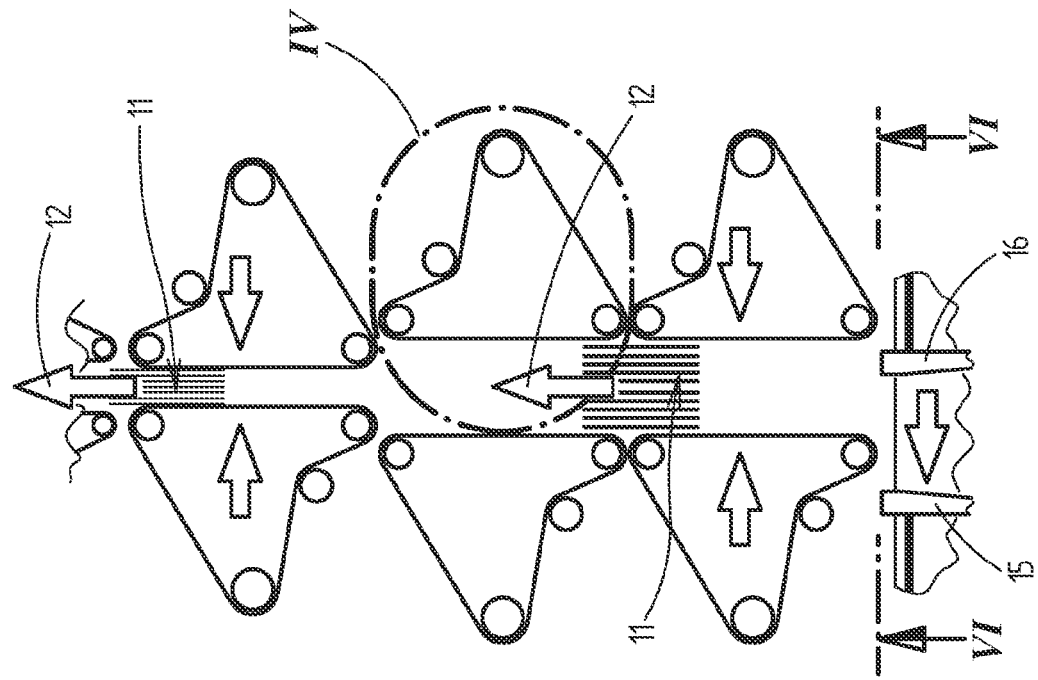
FIGS. 2 and 3 show a detail of the apparatus in the region II in FIG. 1 in an enlarged illustration in successive phases of the method sequence.
Figure 2:
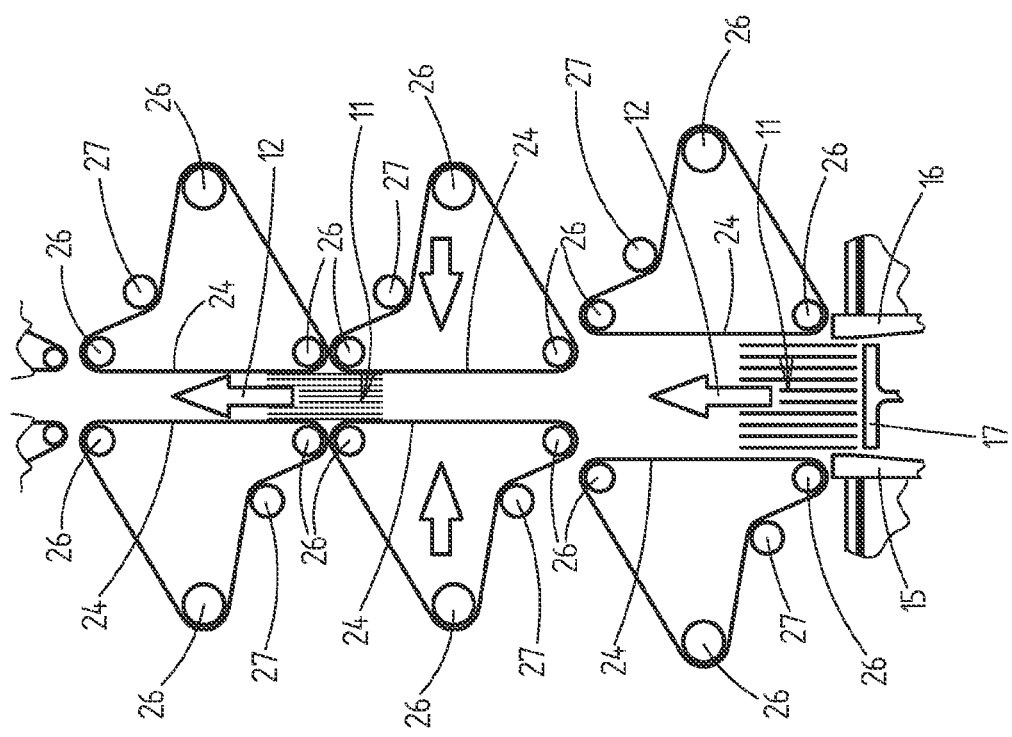
Figure 4:
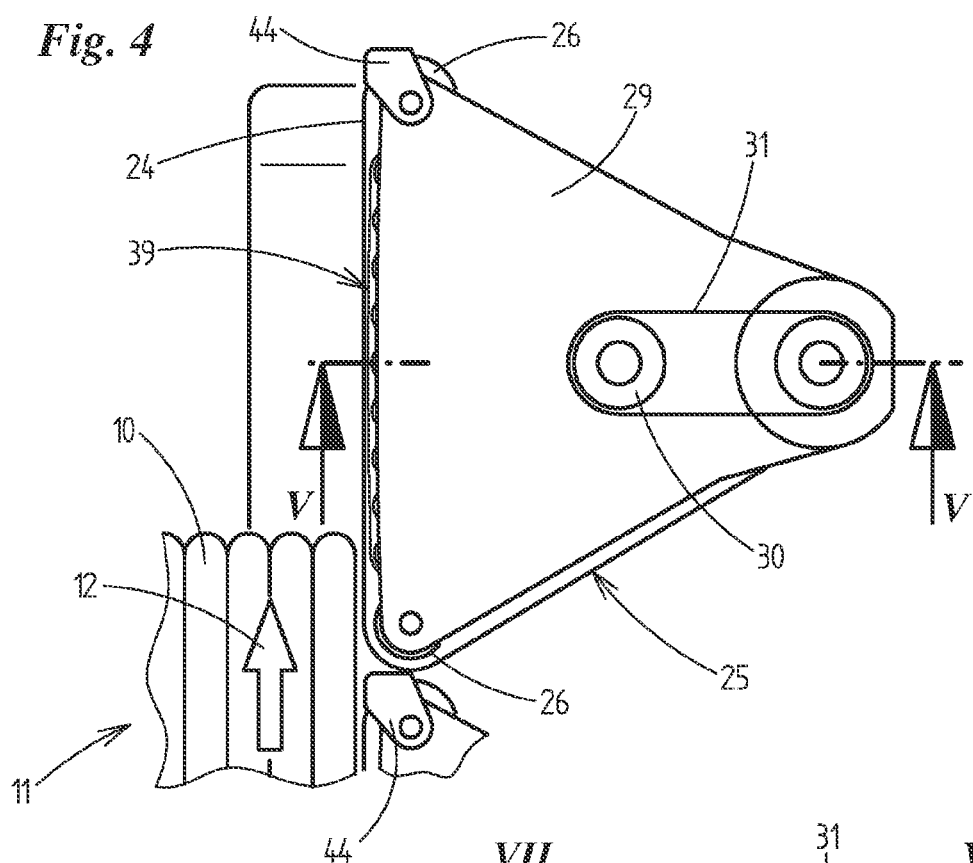
FIG. 4 shows a detail of the apparatus in an enlarged illustration in the region IV in FIG. 3.
Figure 5:
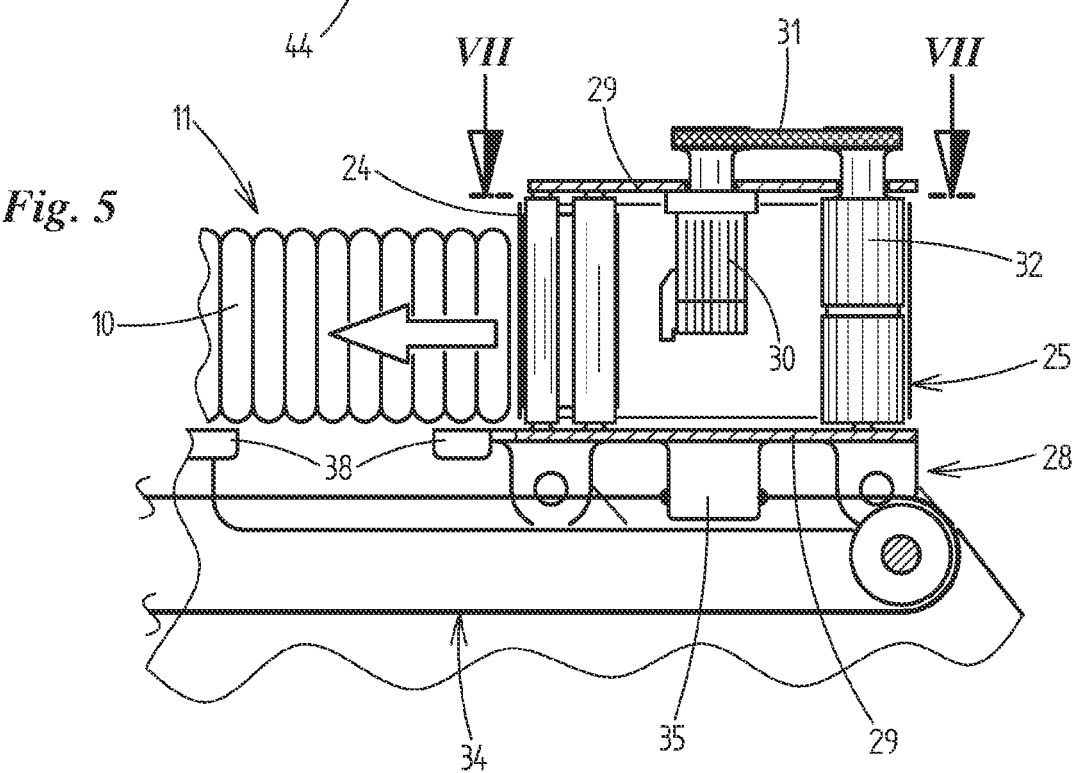
FIG. 5 shows a vertical section through the apparatus along the line of section V-V in FIG. 4.

As shown in FIGS. 1 to 3, in each compression device 18 a conveyor strand 24 bears in each case at different sides of the group 11. By moving together the conveyor strands 24 transversely relative to the conveying direction 12, the group 11 is compressed. At the same time, the group 11 is conveyed continuously in the conveying direction 12 by the conveyor strands 24.

In order to transfer the group 11 to a subsequent compression device 18, there is provision for the conveyor strands 24 to be orientated at both sides of the group 11 in alignment with the conveyor strands 24 of the subsequent compression device 18 (FIGS. 2 and 3). In this manner, a transfer of the group 11 is possible without the compression thereof becoming lost. The degree of compression of the group 11 at the end of a first compression device 18 corresponds in this instance to the degree of compression of the group 11 at the beginning of a subsequent compression device 18.

Another possibility may involve compressing the group 11 in a compression device 18 first beyond the intended degree of compression of the compression device 18. Afterwards, by moving back the conveyor strands 24 the degree of compression intended for the transfer to the next compression device 18 can be adjusted.

After a group 11 has been transferred to a subsequent compression device 18, the conveyor strands 24 of the compression device 18 are moved back into a starting position again in order to receive the next group 11.

In the exemplary embodiment shown, it is shown that in each compression device 18 only one group 11 is currently transported and compressed. Alternatively, it is also conceivable for a plurality of groups 11 to be transported and/or compressed at the same time in one/each compression device 18.

The structural details of the compression devices 28 are explained below with reference to FIGS. 4 to 9:

FIGS. 4 to 9 show that each endless conveyor 25 is supported on a carriage 28 which can be displaced transversely relative to the travel direction 12. The carriage 28 has an upper and lower carrier plate 29 between which the redirection rollers 26 via which the respective endless conveyor 25 is guided are arranged. Furthermore, on the upper carrier plate 29 there is arranged a servo motor 30 which is coupled via a toothed belt 31 to a drive pinion 32. The drive pinion 32 is coupled to the endless conveyor 25 which in this instance is in the form of a toothed belt.

Figure 6:
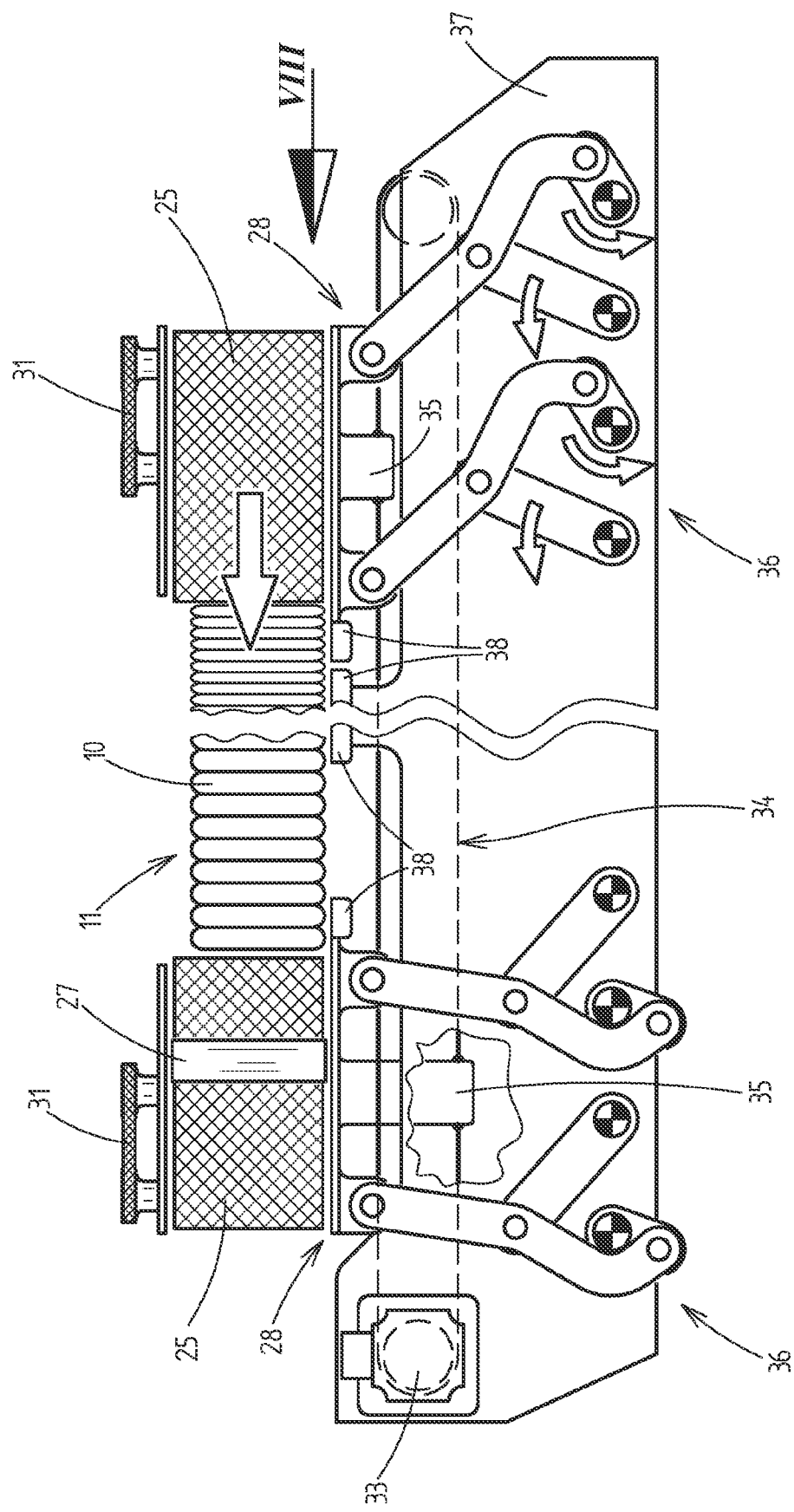
FIG. 6 shows a vertical section through the apparatus along the line of section VI-VI in FIG. 3.

According to FIG. 6, a common drive motor 33 is provided for the two endless conveyors 25 of a compression device 18. The drive motor 33 is coupled to the two carriages 28 by means of a toothed belt 34. To this end, each carriage 28 has a toothed belt fastening 35 via which the respective carriage 28 is coupled to the toothed belt 34. In order to bring about an opposing movement of the two carriages 28, one carriage 28 is coupled to the lower strand of the toothed belt 34 and the other carriage 28 is coupled to the upper strand of the toothed belt 31.

Alternatively, it is also conceivable for each carriage 28 to be driven by means of a separate drive motor, in particular in order to be able to enable a higher force for a greater compression of the group 11. In particular, for example, for the third compression device 18 this may be necessary in order to achieve an even higher degree of compression.

Preferably, the groups 11 are moved at a constant speed in the conveying direction 12 and in this instance compressed. However, it may also be conceivable for the speed to be reduced during the compression.

As can be seen in particular in FIGS. 2 and 3, the endless conveyors 25 are constructed to be identical at both sides of the conveying path in terms of their structure and arrangement of the members. In this regard, this unit can be used without modification and only by adapting the relative position (rotation in horizontal projection) at both sides of the conveying path.

Each carriage 28 is supported by means of linear guiding gear mechanisms 36 on a base frame 37 of the apparatus. Each linear guiding gear mechanism 36 has a plurality of lever arms which are connected to each other or are pivotably arranged on the base frame 37 in such a manner that the carriages 28 can be moved back and forth precisely in a horizontal plane. Whilst the drive motor 33 via the toothed belt 34 ensures driving of the carriages 28, the linear guiding gear mechanisms 36 take on the precise guiding of the carriages 28 in a horizontal plane transversely relative to the conveying direction 12.

Figure 7:
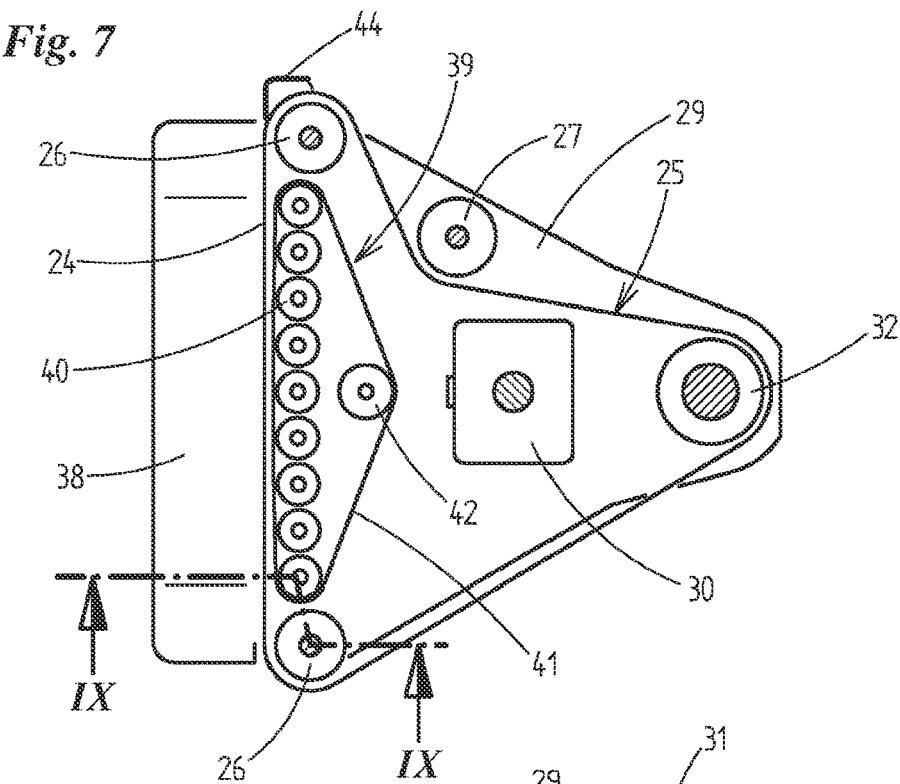
FIG. 7 shows a horizontal section through the apparatus along the line of section VII-VII in FIG. 5.
Figure 8:
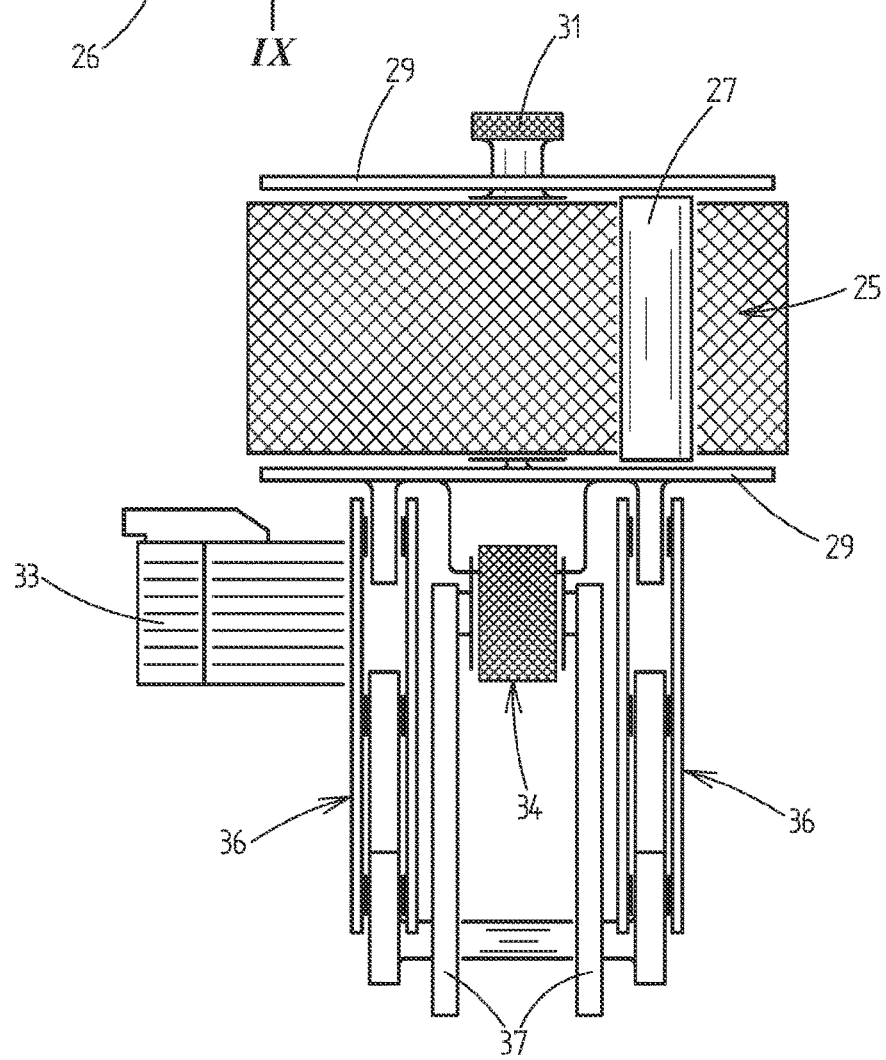
FIG. 8 shows a side view of a portion of the apparatus according to arrow VIII in FIG. 6.

In particular, FIG. 7 shows that laterally beside the conveyor strand 24 a horizontal support sheet 38 which is supported on the carriage 28 is further provided. The support sheet 38 serves to support the group 11.

Furthermore, an inner support 39 is provided in order to support the conveyor strand 24. The inner support 39 has a series of running rollers 40 which are coupled to a rotating inner belt 41. A clamping roller 42 is used in a similar manner to the clamping roller 27 for clamping the inner belt 41.

The running rollers 40 of the inner support 39 are arranged along a bent contour. By abutting the inner belt 41 against the inner side of the conveyor strand 24 this also has a (slightly) curved contour.

Figure 9:
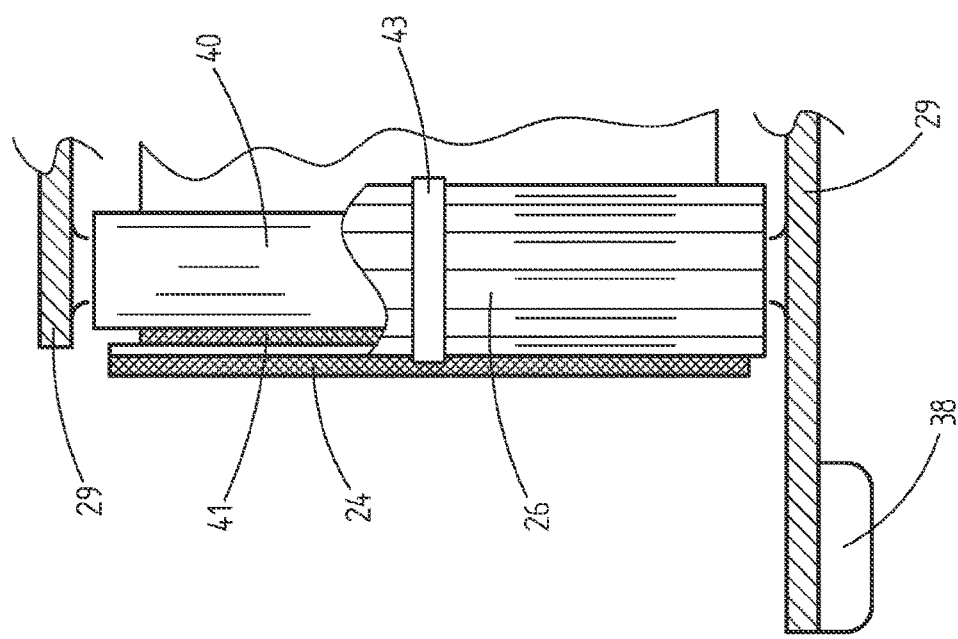
FIG. 9 shows a vertical section through the apparatus along the line of section IX-IX in FIG. 7, and FIGS. 10 and 11 show a detail of the apparatus in the region X in FIG. 1 in two different configurations.

FIG. 9 shows that the redirection rollers 26 have a preferably circumferential web 43 which serves to guide the toothed belt of the endless conveyor 25 which has at the rear side a corresponding recess into which the web 43 is introduced.

In a corner region of each carriage 28, there is arranged a guide plate 44 which serves to bridge the gap between two successive endless conveyors 25.

Figure 11:
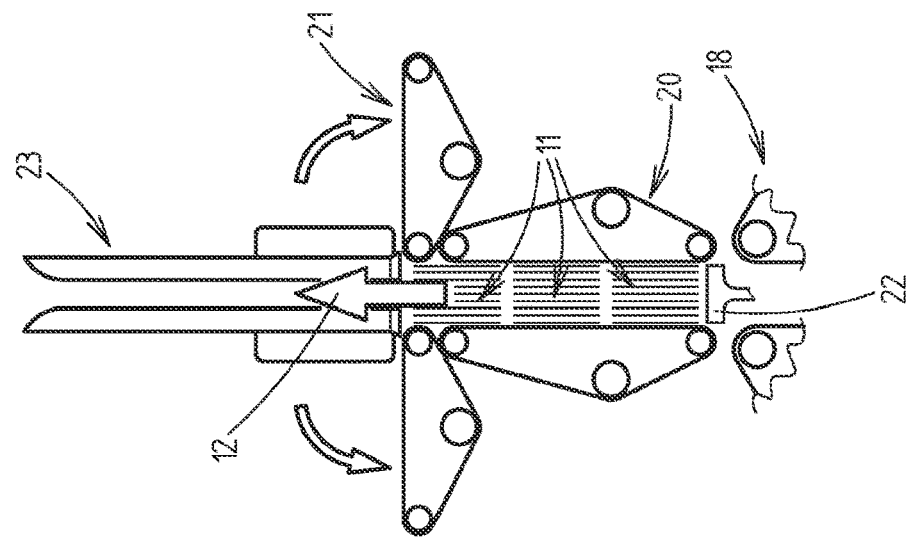
Figure 10:
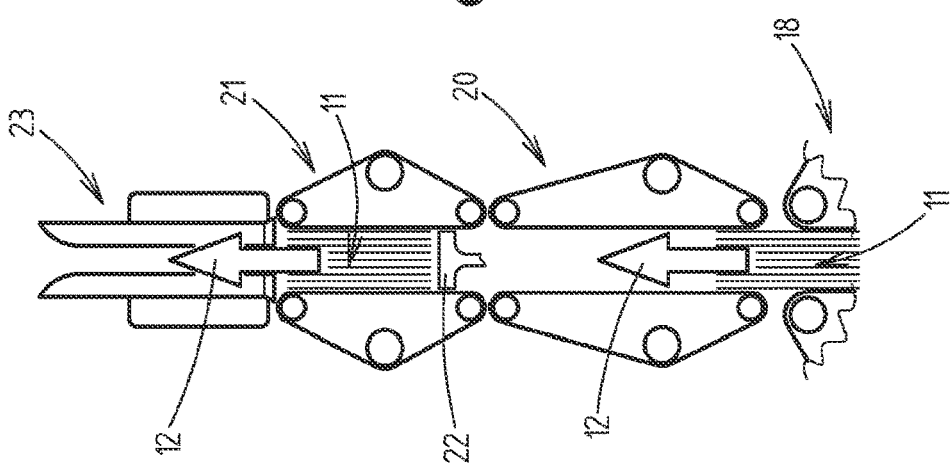

FIGS. 10 and 11 show an additional particular feature of the apparatus. Accordingly, following the third compression device 18, two grouping stations 20, 21 are provided. In the grouping stations 20, 21, the groups 11 are conveyed similarly to how they are conveyed by the conveyor strands 24 in the conveying direction 12.

In order to be able to shorten the length of the grouping stations 20, 21 in the conveying direction 12 as necessary, there is provision for the grouping station 21 which is located downstream in the conveying direction 12 or the conveyors thereof to be pivotably arranged (FIG. 11).

The background of this measure involves the formation in which the group 11 or plurality of groups 11 are intended to be introduced into the packaging. In a packaging formation with a plurality of groups 11 one behind the other (FIG. 10), a corresponding space or structural length is required in order to provide the groups 11. In a packaging formation which is in contrast shorter, for example, comprising one group 11, such a long grouping station 20, 21 is not required and the group 11 can be moved directly from the grouping station 20 into the shuttle 23 and introduced into the packaging. As a result of the shorter conveying path, a cycle time saving is achieved.

LIST OF REFERENCE NUMERALS

10 Object
11 Group
12 Conveying direction
13 Compartment belt
14 Sliding member
15 Compression jaw
16 Compression jaw
17 Sliding member
18 Compression device
19 Compression member
20 Grouping station
21 Grouping station
22 Sliding member
23 Shuttle
24 Conveyor strand
25 Endless conveyor
26 Redirection roller
27 Clamping roller
28 Carriage
29 Carrier plate
30 Servo motor
31 Toothed belt
32 Drive pinion
33 Drive motor
34 Toothed belt
35 Toothed belt fastening
36 Linear guiding gear mechanism
37 Base frame
38 Support sheet
39 Inner support
40 Running roller
41 Inner belt
42 Clamping roller
43 Web
44 Guide plate

The invention claimed is:

1. A method for handling flat objects (10), wherein a group (11) of objects (10) is subjected to a compression operation in a compression device (18) so that the group (11) of objects (10) has a degree of compression as a result of the compression, comprising:
   arranging a plurality of compression devices (18) one after the other;
   compressing the group (11) of objects (10) with a first compression device of the plurality of compression devices (18); and
   supplying the compressed group (11) of objects (10) to a second compression device of the plurality of compression devices (18), whereby the respective degree of compression of the group (11) of objects (10) is further compressed in the second compression device of the plurality of compression devices (18) in order to achieve a higher degree of compression, wherein the plurality of compression devices (18) are arranged directly one after the other in order to transfer the group (11) of objects (10) with the respective degree of compression thereof directly from one of the plurality of compression devices (18) to a subsequent one of the plurality of compression devices (18), wherein the plurality of compression devices (18) are arranged in a cascading manner one after the other so that the group (11) of objects (10) is increasingly compressed in each of the plurality of compression devices (18), wherein the group (11) of objects (10) is transported in all of the plurality of compression devices (18) in a corresponding conveying direction (12), wherein each of the plurality of compression devices comprises opposing endless conveyors including a respective conveyor strand, and a respective carriage coupled to each of the endless conveyors, wherein the respective conveyor strands of each compression device bear on the group (11) of objects (10) at opposing sides and are orientated substantially parallel with each other, and wherein the carriages of each compression device are configured to move towards each other transversely relative to the conveying direction to move the respective conveyor strands transversely towards each other to thereby compress the group of object while the group of objects is continuously transported in the conveying direction in the respective compression devices.

2. The method as claimed in claim 1, wherein the group (11) of objects (10) is transported through the conveyor strands of the respective compression device (18) in the conveying direction (12), whilst conveyor strands compress the group (11) in the respective compression device (18).

3. The method as claimed in claim 1, wherein the group (11) of objects (10) is transported along a notional conveying axis which extends through all the compression devices (18) in the conveying direction (12), wherein conveyor strands of the respective compression devices (18) are arranged symmetrically at different sides of the conveying axis and during the compression are moved toward each other symmetrically relative to the conveying axis.

4. The method as claimed in claim 1, wherein the group (11) of objects (10) in one or in some or in all of the compression devices (18) is initially compressed to a higher degree of compression than is intended for the transfer to the subsequent compression device (18) in each case and in that the degree of compression is then reduced to the corresponding degree for the transfer to the subsequent compression device (18) in each case.

5. The method as claimed in claim 1, wherein a plurality of groups of objects (10) are located and compressed at the same time in one or some or all of the compression devices (18).

6. An apparatus for handling flat objects (10), comprising:
a plurality of compression devices (18) arranged one after the other, the plurality of compression devices (18) comprising:
a first compression device (18) in which a group (11) of objects (10) is subjected to a first compression operation so that the group (11) of objects (10) has as a result of the first compression, a first degree of compression; and
at least one further compression device (18) in which the group (11) of objects (10) is subjected to a further compression operation so that the group (11) of objects (10) has as a result of the further compression a higher further degree of compression, wherein the apparatus is configured to supply the group (11) of objects (10) which is compressed with the first compression device (18) with the first degree of compression thereof to the at least one further compression device (18) to further compress the group (11) of objects (10) in order to achieve the higher further degree of compression, wherein the plurality of compression devices (18) are arranged directly one after the other in a cascading manner in order to transfer the group (11) of objects (10) with the respective degree of compression thereof directly from one of the plurality of compression devices (18) to a subsequent following one of the plurality of compression device (18), wherein the apparatus is configured to increasingly compress the group (11) of objects (10) in each subsequent one of the plurality of compression devices (18), wherein each of the plurality of compression devices comprises opposing endless conveyors including a respective conveyor strand, and a respective carriage coupled to each of the endless conveyors, wherein the respective conveyor strands of each compression device bear on the group of objects at opposing sides and are oriented substantially parallel with each other, wherein the carriages of each of the plurality of compression devices are configured to move towards each other transversely relative to the conveying direction to move the respective conveyor strands transversely towards each other to thereby compress the group of objects while the group of objects is continuously transported in the conveying direction in the respective compression devices.

7. The apparatus as claimed in claim 6, wherein the conveyor strands (24) at an internal running side facing away from the transport side can be supported by means of an internal support (39), namely by means of a conveyor strand (41), which is supported on running rollers (40), of the internal support (39).

8. The apparatus as claimed in claim 6, wherein the endless conveyors (25) can be moved toward each other by means of one or more drives (33), in order to compress the group (11) of objects (10), wherein there is provision for the movement to be carried out in a horizontal plane and for the endless conveyors (25) to be guided by means of a linear guiding gear mechanism (36).

9. The apparatus as claimed in claim 6, wherein the endless conveyors (25) are constructed to be identical in terms of structure at both sides of the group (11) of objects (10), namely with an identical arrangement of the respective members.

10. The apparatus as claimed in claim 6, wherein the endless conveyors (25) are formed in each case by one or more belt conveyors.

* * * * *